United States Patent [19]
Haytayan

[11] Patent Number: 5,366,082
[45] Date of Patent: Nov. 22, 1994

[54] NAIL SUPPORT STRIPS

[76] Inventor: Harry M. Haytayan, 32 Indian Rock Rd., Nashua, N.H. 03063

[21] Appl. No.: 186,792

[22] Filed: Jan. 25, 1994

[51] Int. Cl.⁵ ............................................. B65D 85/24
[52] U.S. Cl. .................................... 206/343; 206/347
[58] Field of Search ............... 206/343, 344, 345, 346, 206/347

[56] References Cited

U.S. PATENT DOCUMENTS

| | | | |
|---|---|---|---|
| 3,954,176 | 5/1976 | Haytayan | 206/347 |
| 4,106,618 | 8/1978 | Haytayan | 206/343 |
| 4,106,619 | 8/1978 | Haytayan | 206/346 |
| 4,718,551 | 1/1988 | Whitledge | 206/343 |
| 4,932,821 | 6/1990 | Steffen et al. | 206/347 |
| 5,069,340 | 12/1991 | Ernst et al. | 206/347 |

Primary Examiner—William I. Price
Attorney, Agent, or Firm—Pandiscio & Pandiscio

[57] ABSTRACT

An article of manufacture is provided which enables nails to be fed serial fashion to a nail-driving device. The article of manufacture comprises a nail-supporting strip in the form of interconnected sleeves, each sleeve having a plurality of radially-extending ribs that define a nail-receiving passageway, and an end wall that is formed integral with the ribs. The sleeves are connected to each other by narrow webs that permit the sleeves to be sheared off from one another. The strip is adapted to receive and support a plurality of nails, with each nail being received and supported by a separate sleeve. The resulting combination of strip and nails forms a nail clip that is adapted to be loaded into the nail-receiving magazine of a nail-driving device.

8 Claims, 1 Drawing Sheet

NAIL SUPPORT STRIPS

This invention relates generally to provision of fasteners in strip form for use with impact-type power driven tools, and more particularly to an improvement over nail strips of the kind shown in U.S. Pat. No. 4106618.

BACKGROUND OF THE INVENTION

A number of pneumatically or hydraulically operated impact tools have been designed for driving nails into metal/metal or metal/concrete workpieces, with the fasteners being fed from a spring-loaded magazine. As used herein, the term "nail" is intended to include various type of fastening pins that are designed to be driven into a workpiece. The term "workpiece" denotes a multi-layered arrangement of separate members that are to be fastened together by fastening pins, e.g., a corrugated steel decking plate overlying a framework (substrate) formed of interconnected beams, e.g., I-shaped or H-shaped beams or bar joists (2 L-shaped angle irons secured back to back). Such impact tools, often called "powered drivers" or "powered nail drivers" and exemplified by U.S. Pat. Nos. 4,253,598 4,227,637, 4,196,833, 4,040,554, 3,952,398, 3,711,008, 3,638,532 and 3278103 and the prior art cited therein, generally comprise a housing having a hammer guide track in the form of a bore along which a fastening pin driver element (also known as a "hammer") is reciprocated rapidly on command, and a side opening intersecting the guide track which functions as a fastening pin feed port, whereby a fastening pin may be introduced from a magazine into the guide track in the path of the driver element immediately after the driver element has completed a cycle of operation consisting of a drive stroke and a return stroke. While it is possible to load the magazine with loose fastening pins on a one by one basis, loading is facilitated if the fastening pins are preassembled in a plastic strip so as to form a clip which can be easily and rapidly inserted into the magazine, and the magazine is provided with a spring biased pusher element for advancing the clip along a guideway in the magazine through the fastening pin feed port into the hammer guide track.

Examples of clips of fasteners that have been used in powered nail-driving tools are disclosed in U.S. Pat. No. 3954176, issued on May 4, 1976 to Harry M. Haytayan, U.S. Pat. Nos. 4106618 and 4106619, both issued on Aug. 15, 1978 to Harry M. Haytayan; and U.S. Pat. No. 4106819, issued on Aug. 16, 1978 to Harry M. Haytayan; and the prior art cited in the aforementioned patents.

Prior to this invention, the preferred form of nail clip was one that comprised a plastic strip in the form of a row of interconnected sleeves, with a nail extending through and gripped by portions of each sleeve. Such plastic strips are arranged so that the leading sleeve may be sheared off from the remainder of the strip when the nail carried by that sleeve is driven by the hammer of the driver.

However, providing strips of nail-supporting sleeves that can be sheared off as intended without jamming the tool has presented problems. It is essential that the plastic strip be designed so as to avoid or minimize any tendency of the leading nail to tilt as it is introduced into the hammer guide track or while it is in the hammer guide track, since whenever a nail is not aligned with the axis of the guide track, there is an increased likelihood that such nail will jam the tool when the hammer commences its drive stroke.

Accordingly it is known that each sleeve should be sized so as to make a close sliding fit in the hammer guide track. Typically the guide track is a bore of circular cross-section and the sleeves have a generally cylindrical shape with a maximum outer diameter ("o.d.") about 0,010" less than the diameter of the hammer guide track. This requirement is particularly acute for nail clips where the plastic sleeves do not surround the nail shanks for their full lengths and are spaced from one another by interconnecting web sections.

Another known design technique for reducing the likelihood of jamming is to connect them with web sections that minimize the spacing or gap between adjacent sleeves but extend for substantially the full height of the sleeves, whereby the web sections are better able to keep the sleeves perpendicular to the longitudinal axis of the nail strip. Also the web sections are made thin to minimize the shear force required to separate the leading nail sleeve from the next nail sleeve. Typically the web sections have a length measured along the length of the strip of about 0.015 to 0.020" and a width (thickness) of about 0.035".

Another design guide rule to prevent tilting of the nail disposed in the hammer guide track is to make the strip of a relatively high density plastic. As used herein the term "high density plastic", e.g., high density polyethylene, means a material with a durometer value of at least 70 on the A scale. A strip of the type described made of a 70–80 durometer plastic provides a stiffness adequate to keep the leading nail straight in the hammer guide bore, thus minimizing jamming of the tool. However, using a high density plastic nail strip suffers from the handicap that the plastic sleeves do not squash as readily as they would if made of a low density material, so that often a substantial portion of the squashed sleeve will be trapped between the workpiece and the driven nail.

The stiffness of the nail strip is more critical in steel decking applications where metal deck fastening pins (nails) are required to penetrate a relatively thin steel decking, such as a 0.029" thick (22 gage) corrugated steel sheet, and anchor it to a steel substrate, e.g., to the flange of a bar joist as previously described, such flange typically having a thickness of 0,125". If a plastic sleeve holding the decking pins is made of a relatively stiff material such as an 80 durometer polyethylene, when a decking pin is driven into the steel decking, the plastic sleeve surrounding that pin tends to act as a piston, deforming the decking and thereby transmitting a force that causes the substrate (bar joist) to (a) separate from the decking so as to leave a gap therebetween and/or (b) deform the substrate by bending and twisting the leg portion of the angle rods that make up the bar joists, and/or (c) preventing the pin from being driven fully into the substrate. In that particular circumstance, the plastic sleeve surrounding the driven nail may or may not completely disintegrate or squeeze out from between the nail head and the steel decking; but regardless of what happens to the squashed sleeve, the holding power of the pin is diminished, frequently enough to require application of another pin to assure that the decking is adequately secured to the substrate. In order to achieve maximum holding force, and thus transmit maximum shear strength to the deck complex, it is essential that the underside of the head of the pin (nail) be in full contact with the steel deck when the steel deck is fastened to the bar joist.

Making the strips of a relatively low density polyethylene, e.g., a 40-60 durometer polyethylene, allows the decking pins to be driven so as to achieve maximum holding power. However, the softer low density strips are plagued by the aforementioned tendency of the leading nail to tilt in the hammer guide bore, thereby increasing the likelihood of jamming. This tendency is increased when the tool is used outdoors in hot weather, since a thermoplastic material such as polyethylene will soften with increasing temperature, thereby decreasing the stiffness of the nail strip. In connection with the concern about softening of the nail strip due to increasing temperature, it is important to appreciate that the pushing force exerted on the nail clip by the clip pusher member of the magazine of a tool such as is shown in U.S. Pat. No. 4253598 tends to compress and hence deform the leading sleeve that is disposed in the hammer guide track, and, depending on the ambient temperature and how long the tool lays idle in the sun, the deformation can be sufficient to cause the nail carried by the leading sleeve to be misaligned in the hammer guide track bore, with the result that the tool will jam the next time it is operated.

SUMMARY OF THE INVENTION

A general object of the invention is to provide an improved nail-supporting strip of the type comprising a plurality of interconnected hollow bodies or sleeves each adapted to hold a nail.

Another object is to provide an improved nail clip for powered nail drivers, the nail clip comprising an improved plastic nail-supporting strip of the type consisting of a number of nail-holding sleeves which are designed to be separated from the strip when the nails that they support are driven into a workpiece.

Still another object is to provide a nail assembly or clip for a powered driver comprising an improved plastic nail-supporting strip and a plurality of metal nails for fastening metal decking to a substrate carried by said strip, with the nail-supporting strip being designed so that each nail in turn is properly aligned in the hammer guide bore of the driver and is driven into a workpiece so as to achieve maximum holding power.

The foregoing objects, and other objects hereinafter rendered obvious, are achieved by providing an improved plastic nail-supporting strip for a nail clip in the form of a series of individual, mutually-connected nail-supporting sleeves, with each sleeve being connected to an adjacent sleeve by a narrow web so as to facilitate the shearing off of each sleeve individually and in sequence in response to the shearing force produced when a nail held by said each sleeve is impacted by the hammer of an impact type driver. The improvement provided by this invention consists of providing each sleeve with an end wall. The end walls allow the nail strips to be made of a relatively soft plastic, since the end walls act as stiffeners against radial deformation of the sleeves. Another advantage of the improvement provided by this invention is that, at least in the case of steel decking applications, it does not prevent the plastic sleeves from deforming axially under the force of the nail-driving hammer to an extent sufficient to make certain that the nails are driven so as to achieve maximum holding power, with the heads of the driven nails acting to force the several layers of the workpiece in tight engagement with one another without distorting (bending or twisting) the substrate (e.g., bar joist).

BRIEF DESCRIPTION OF THE DRAWINGS

Other objects, advantages and features of the invention are disclosed or rendered obvious by the following detailed description which is to be considered together with the accompanying drawing wherein.

Unless otherwise stated, like numerals are used to refer to like parts in the several figures of the drawing.

DETAILED DESCRIPTION OF THE PRIOR ART

Figure 1:
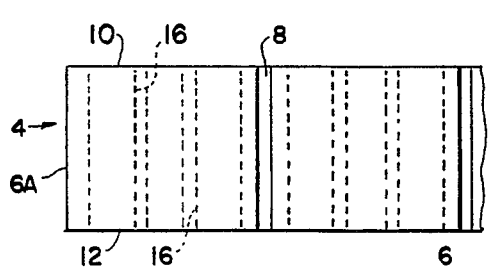
FIG. 1 is a side elevation of a short section of a prior form of nail strip.

Referring now to FIGS. 1–4, there is shown a nail clip or assembly which illustrates the prior art and is designed to be loaded into a magazine of a nail driver of the type shown in U.S. Pat. No. 3711008. Although not shown in FIGS. 1–4 hereof, it is to be understood that the nail driver comprises a magazine having a means (not shown) for slidably supporting the clip and guiding it forward toward the hammer guide bore of the driver under the influence of a spring-biased pusher associated with the magazine.

Still referring to FIGS. 1–4, the nail clip shown therein comprises a nail-supporting strip 4 which consists of a plurality of identical sleeves 6 that are connected to one another by short webs 8 that extend longitudinally of the strip and radially of sleeves 6. The nail-supporting strip is preferably molded of polyethylene, although it may also be made of another moldable plastic material e.g., nylon, Teflon or polypropylene, with or without a filler material in particle form such as talc. The strips may be made of any convenient length, but conventionally each strip consists of ten sleeves 6. Each sleeve has a cylindrical outer surface and flat top and bottom surfaces 10 and 12 which extend parallel to one another. Each sleeve also has a cylindrical inner surface that is coaxial with its outer surface but is interrupted by a plurality of equally spaced radially-extending internal ribs 14 that extend for the full height of the sleeve. The inner surfaces 16 of ribs 14 of each sleeve are flat and are arranged in a square configuration so as to be tangent to a circle that is coaxial with the sleeve, i.e., concentric with the inner and outer surfaces of the sleeves.

Figure 3:
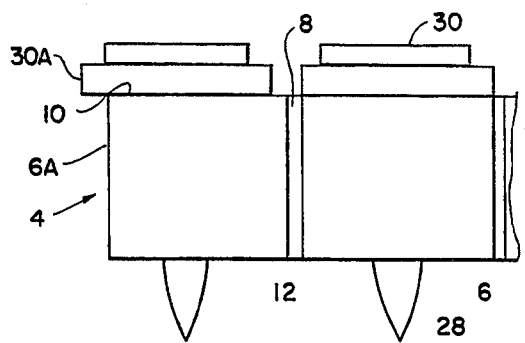
FIG. 3 is side view in elevation of a nail clip embodying the nail strip of FIG. 1, showing how the nail strip may be deformed while disposed in a power driver.
Figure 2:
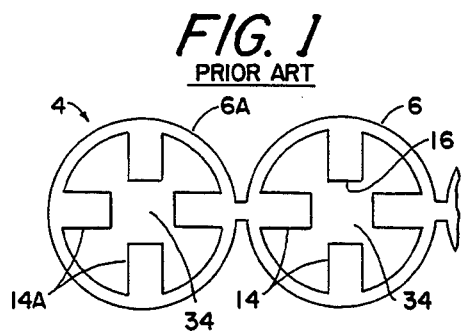
FIG. 2 is a bottom view of the nail strip of FIG. 1.
Figure 4:
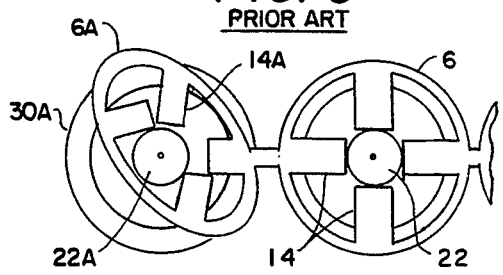
FIG. 4 is a bottom view of the nail clip shown in FIG. 3.
Figure 5:
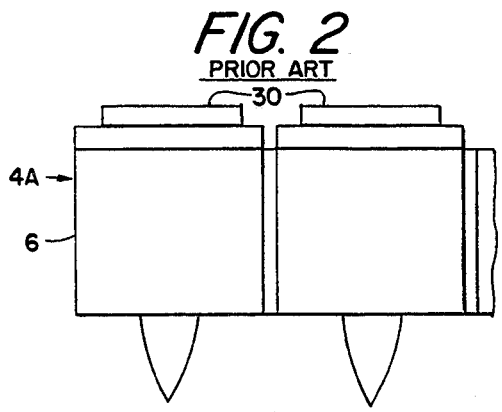
FIG. 5 is a side elevation, partly in section, of a short section of a nail clip comprising a preferred form of nail-supporting strip provided in accordance with this invention.
Figure 6:
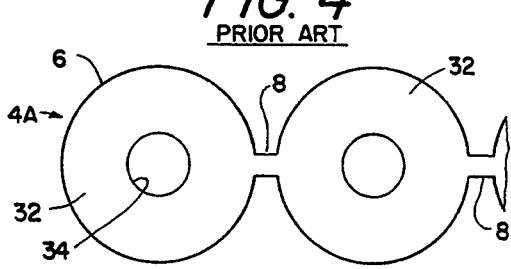
FIG. 6 is a bottom view of the nail clip of FIG. 5.
Figure 7:
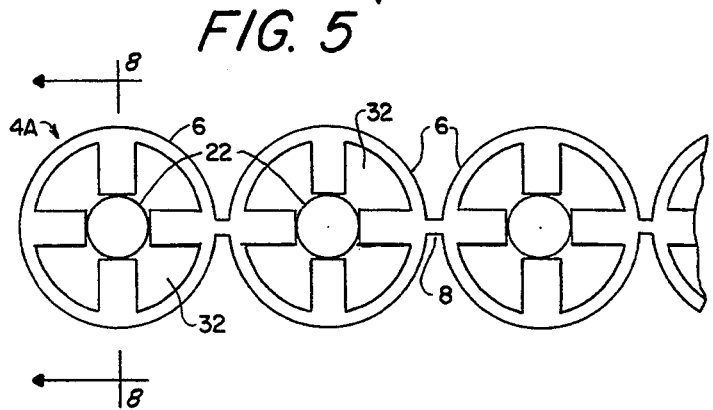
FIG. 7 is an enlarged plan view of the nail-supporting strip of FIG. 5.
Figure 8:
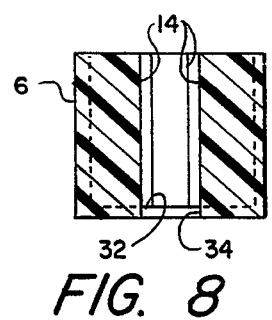
FIG. 8 is a sectional view taken along line 8—8 of FIG. 7.

Referring to FIGS. 3 and 4, received in each sleeve of the nail strip is a decking pin or nail which is characterized by a shank 22 having a pointed end 28, and a contoured head 30. The latter has a maximum o.d. that preferably is the same as or slightly smaller than the o.d. of sleeves 6. As seen in FIG. 3, the nails are disposed so that preferably, but not necessarily, the undersides of their heads 30 engage the upper end surfaces 10 of the sleeves, and the nails are long enough for their shanks to protrude from the lower ends of the sleeves. In each sleeve, the passageway 34 (FIG. 2) defined by the inner surfaces 16 of the ribs is sized so that the ribs will grip the nails with a force which is at least equal to the amount of force required to be exerted on the nail by the hammer of the impact driver in order to cause one sleeve to be sheared off from the adjacent sleeve, as is done when the driver is operated to drive a nail into a workpiece.

In use the nail clip is inserted into the magazine of the power-driven impact tool, with the nail clip being urged toward the guide track of the tool by a spring-powered pusher member associated with the magazine.

In this connection it is contemplated that the magazine (not shown) is of the type having a pair of opposite side walls which are separated from one another just enough to accept the strip with a close sliding fit. Additionally, the opposite side walls of the magazine are provided with guides for the clip, whereby the sleeves are free to slide lengthwise of the magazine but are constrained against relative vertical movement. It is to be appreciated also that the round nail-receiving hammer guide bore in the impact driver (see, for example, bore 54 and liner 155 of the tool shown in U.S. Pat. No. 4,253,598 and the bores 46 and 106 of the tool shown in U.S. Pat. No. 4,040,554) has a diameter that is only slightly larger (e.g., by about 0.010″) than the maximum diameter of the sleeves and the nail heads. Similarly the side opening in the tool (not shown) through which the leading sleeve and an associated pin of the nail clip can advance into the hammer bore is contoured so as to have a shape similar to the cross-sectional shape of the nail clip, but is sized so as to be only slightly larger in width (by about 0.010″) than the maximum diameter of the sleeves and pins. In such a device, when the leading sleeve and its associated fastener are moved into the hammer guide bore in position to be driven by the hammer, the next sleeve with its nail is positioned in the side opening of the tool and is restrained against vertical movement primarily because the nail strip is restricted against such movement by the magazine.

As noted hereinabove, in the usual case, the nail-receiving magazine of the driver has a spring-biased pusher which indexes the nail clip forward to place a new sleeve in the hammer guide bore of the driver following each complete nail-driving cycle of the hammer. When the hammer undergoes its nail-driving stroke, it impacts the nail head 30 which lies in its path and drives it and the associated sleeve downward with sufficient force to shear the web 8 that connects that sleeve to the sleeve that is next in line. The web is sheared substantially at its midpoint along a line that is parallel to the axis of the hammer. As the severed sleeve and the associated nail are driven downward by the hammer, they cooperate with the surrounding wall of the hammer bore to keep the fastener aligned with the hammer axis as it is driven into the workpiece.

When the nail is driven into the workpiece the sleeve that carried it is squashed between the nail head and the workpiece. Depending on the durometer of the plastic strip, the squashed sleeve will either disintegrate (as occurs in the case of a relatively high durometer plastic that is loaded with an inorganic filler powder) or be captivated as a relatively flat mass between the nail head and the workpiece (as occurs in the case of a relatively low durometer plastic strip). In the latter case the sleeve is deformed around and under the head of the nail that has been driven into the workpiece. If the plastic nail strip is loaded with an inert filler material such as talc, the impacted sleeve will tend to disintegrate as it is squashed, so that, depending on its durometer, at least some of the sleeve will be separated free of the nail head and the workpiece.

FIGS. 3 and 4 illustrate how the leading sleeve of a soft or softened nail strip can be deformed so as to cause a nail misalignment in the hammer guide bore of a powered driver that will cause jamming of the driver. The pressure exerted on the nail clip by the nail clip pusher in the nail clip magazine of a driver of the type shown in U.S. Pat. No. 4253598 tends to radially deform the leading nail-supporting sleeve 6A (FIG. 2) as or after that sleeve is pushed into the hammer guide track bore of the driver, with the result that sleeve 6a is deformed radially enough to shift its ribs 14A out of concentric relation with shank 22A of the nail associated with sleeve 6A, whereby that shank 22A is no longer gripped symmetrically by ribs 14A. More particularly with reference to FIGS. 3 and 4, nail head 30A of the leading nail contacts and is restrained by the surrounding surface of the hammer guide track bore of the driver tool, while the leading sleeve 6A is distorted radially so as to no longer be concentric with the hammer guide bore. As a result the leading nail is no longer gripped symmetrically, e.g., at four (4) equally-spaced points, about its circumference and instead is disposed so as to allow it to tilt and cause jamming when the head 30A of that nail is subsequently struck by the hammer of the driver tool when the latter undergoes its next drive stroke.

PREFERRED EMBODIMENT OF THE INVENTION

Referring now to FIGS. 5 to 8, the present invention provides a nail strip 4A that improves on nail strip 4 of FIGS. 1–4 by providing an end wall 32 at the lower end of each of the sleeves 6. End wall 32 is formed integral with the bottom ends of ribs 14 and is characterized by a central aperture 34 having a diameter that preferably is the same as but may be somewhat smaller or larger (by no than about 0.010″) than the diameter of the circle that is tangent to the inner surfaces 16 of ribs 14. The addition of end wall 32 to each sleeve is important in that it adds resistance to radial deformation of the sleeves. End walls 32 thus permit the sleeves to be made of a relatively low density material, e.g., a 50–60 durometer low density polyethylene, without risk of the leading sleeve, i.e., the sleeve disposed in the hammer guide bore of the driver, being deformed radially under the radial compressive force exerted by the clip pusher in the magazine of the driver. At the same time, the sleeves of lower density polyethylene material are easily squashed axially under the impact of the nail-driver hammer, with the result that each sleeve tends to be squeezed out from under the head of the nail that it carries as that nail is driven into tight contact with the underlying decking/substrate complex without bending the substrate. The squashed sleeve is either entirely squeezed out from below the nail head or else it leaves a very thin deformed layer of plastic between the nail head and the decking plate. In any case, the improved strip shown in FIGS. 5–8 offers the important advantage that the end walls 32 prevent radial deformation of sleeves 6 by the nail clip pusher (not shown) to the extent that tends to cause nail misalignment of the type shown in FIGS. 3 and 4, even when the nail strip is made of a relatively low durometer material such as a 40–50 durometer polyethylene, with the result that nail jamming of the driver tool is substantially reduced in relation to the rate of jamming that is known to occur with prior plastic nail strips.

MODIFICATIONS OF THE INVENTION

Although what is shown in FIGS. 5–8 is a preferred embodiment of the invention, it is to be understood that various modifications may be made without departing from the spirit and scope of the invention as encompassed in the appended claims. For example, the nail-supporting strip could be formed so that the sleeves are offset vertically one from another so as to fit in a magazine which is inclined in the manner illustrated in U.S. Pat. No. 3086207. Also, the inner surfaces of ribs 14 need not be flat, but instead may be circularly curved with a radius of curvature identical to or somewhat larger or smaller than that of the center holes 34 of end walls 32.

Although the invention has particular applicability to securing steel decking to a metal substrate (support structure) of the type described, it is to be appreciated that the nail clips of the present invention may be used, for example, to fasten metal plates to concrete or other substrates. Also, the nails or pins may be made of a metal or metal alloy other than steel.

It also is contemplated that while the webs 8 are preferably made coextensive with the full height of the sleeves, they may be cut back for short distances at their top and/or their bottom ends to an extent that does not materially impair the performance of the nail clip in an impact driver tool. Also the thickness of the webs and sleeves may be varied, with the webs being made relatively thin, but not so thin as to allow the sleeves to be torn apart from one another using a moderate manual force. Similarly, the thickness of the sleeves may be varied within the constraints of being thick enough to support a nail but not so thick as to leave a large residue when sheared off of the strip. Still other possible variations and modifications will be obvious to persons skilled in the art.

As used herein, the terms "nail(s)" and "fastening pins" are to be construed as fastening elements of the type comprising an elongate shank having a distal end and a proximal end, with the distal end being pointed and the proximal end having a head in the form of a peripheral flange that terminates and projects radially from said shank. The term "nail" is intended to embrace different kinds of nails, e.g., common nails and T-nails, as well as pins and studs. Also, the nails could have heads and/or shanks that have non-circular peripheries and their shanks may be threaded, ribbed, knurled or smooth.

Still other possible variations and modifications will be obvious to persons skilled in the art.

What is claimed is:

1. A nail support strip for supporting a plurality of nails in series with one another, such strip comprising a series of parallel sleeves each having a first end and a second end, with each sleeve being connected to an adjacent sleeve and comprising (1) a plurality of internal mutually converging ribs that define a passageway for receiving the shank of a nail, and (2) an end wall at said second end of said sleeve connected to said ribs and providing support against lateral deformation of said sleeve.

2. A strip according to claim 1 wherein the strip is molded of a thermoplastic material.

3. A strip according to claim 1 wherein said ribs extend along radii of said sleeves.

4. A strip according to claim 1 further including a plurality of nails each having a shank that extends within one of said sleeves and is gripped by said ribs and a head that overlies said first end of said one sleeve.

5. A strip according to claim 1 wherein said plurality of ribs define a passageway for receiving a nail, said passageway having a constant cross-sectional area.

6. A strip according to claim 1 wherein each sleeve has a cylindrical outer configuration, and all of said sleeves have identical maximum outer diameters.

7. A nail clip for use in supplying nails to a nail driver tool comprising:

a nail support strip in the form of a series of interconnected sleeves each having a first end and a second end, each sleeve having a plurality of internal radially-extending ribs defining a passageway for receiving the shank of a nail, and an end wall interconnecting said ribs and providing support against lateral deformation of said each sleeve; and a plurality of nails each having a head and a pointed shank with the shank of each nail being disposed within one of said sleeves, with the heads of said nails engaging said first ends of said sleeves and said pointed ends of said shanks projecting from said second ends of said sleeves.

8. A one-piece nail support strip for supporting a plurality of nails in series with one another, said strip being made of a thermoplastic material and comprising a plurality of parallel sleeves interconnected in series by intervening web sections, each sleeve having (a) a generally cylindrical outer configuration, (b) a plurality of internal evenly spaced radially-extending ribs defining a passageway for receiving the shank of a nail, and (c) a radially-extending wall at one end of said sleeve connected to said ribs and supporting said sleeve against radial deformation, said end wall having an opening aligned with said passageway that is sized to accommodate the shank of a nail.

* * * * *